XR 2,794,866
June 4, 1957 L. F. DERT 2,794,866
DEVICE FOR THE TRANSMISSION OF A VIDEO SIGNAL CONTAINING A DIRECT-CURRENT COMPONENT THROUGH A TRANSMISSION CABLE
Filed March 3, 1954
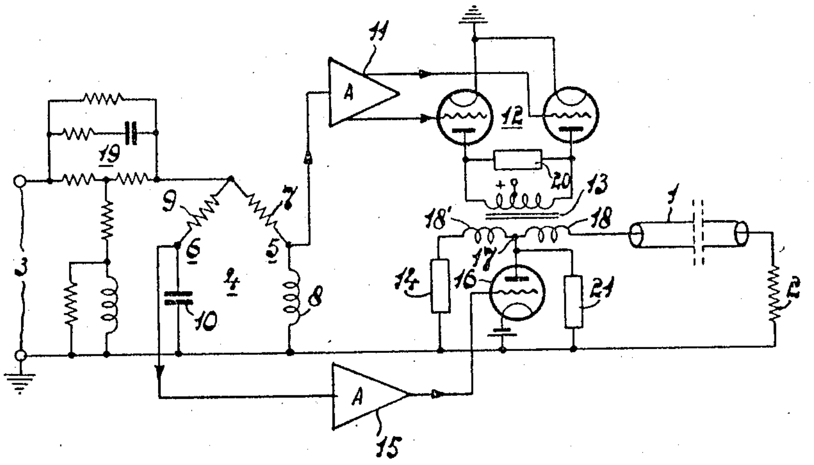
INVENTOR
LODOVICUS FRANCISCUS DERT
BY [signature]
AGENT

United States Patent Office

2,794,866

Patented June 4, 1957

2,794,866

DEVICE FOR THE TRANSMISSION OF A VIDEO SIGNAL CONTAINING A DIRECT-CURRENT COMPONENT THROUGH A TRANSMISSION CABLE

Lodovicus Franciscus Dert, Hilversum, Netherlands, assignor, by mesne assignments, to North American Philips Company, Inc., New York, N. Y., a corporation of Delaware

Application March 3, 1954, Serial No. 413,890

Claims priority, application Netherlands March 28, 1953

5 Claims. (Cl. 179—171)

The invention relates to a device for the transmission of a video signal containing a direct-current component through a transmission cable, for example for the transmission of television signals, radar signals and the like.

The invention has for its object to provide a device of the said kind in which the direct-current component of the video signal is maintained for the transmission and a particularly advantageous transmission quality may be obtained.

According to the invention, for this purpose, the signal to be transmitted is supplied to a two-way filter comprising a high-pass filter and a low-pass filter, the signal occurring at the output impedance of the high-pass filter being supplied to an amplifying tube, coupled via an output transformer with the transmission cable terminated by an artificial impedance, whereas the signal occurring at the output impedance of the low-pass filter is supplied to an amplifying tube, the anode and the cathode of which are connected to a central tapping of the secondary winding of the said output transformer and to the end of the artificial impedance remote from the output transformer respectively.

It should be noted here that it is known for the transmission of signals modulated on a carrier wave to divide the frequency band to be transmitted in frequencies for further transmission.

The invention will now be described with reference to the accompanying drawing.

The transmission device according to the invention, shown in the figure, comprises a relay station for the transmission of television signals in a frequency range of for example 0 to 2.8 mc./s. through a coaxial cable 1, the direct-current component of the television signal being maintained. The coaxial cable 1 is loaded at the end remote from the relay station by its characteristic impedance 2, from which the television signals are derived for further transmission.

In the device shown the television signals coming in through the input terminals 3 are divided in frequency in a two-way filter 4, comprising a high-pass filter 5 and a low-pass filter 6 and supplied through separate amplifiers to the ouput cable 1. The high-pass filter 5 comprises the series connection of a resistor 7 and an inductor 8, constituting the output impedance, whereas the low-pass filter 6 comprises the series combination of a resistor 9 and a capacitor 10, constituting the output impedance. The elements of the filters 5 and 6 are proportioned to be such that for the frequency band to be transmitted these filters have opposite impedances, i. e. the sum of the output voltages of these filters provides a true image of the television signals supplied to the two-way filter 4.

The signals occurring across the output impedance 8 of the high-pass filter 5 are fed through a pre-amplifier 11 to a class AB or class B-connected push-pull amplifier 12, which is coupled through an output transformer 13 with the coaxial cable 1, and to an artificial impedance

14. The output transformer 13 of the amplifier 12 serves in this case inter alia for matching the load.

The low-frequency band of the television signal and the direct-current component are derived from the output capacitor 10 of the low-pass filter 6 and, subsequent to amplification in a pre-amplifying stage 15, fed to an amplifying tube 16, the anode and the cathode of which are connected to a central tapping 17 of the secondary winding 18, 18′ of the output transformer 13 and to the end of the artificial impedance 14, remote from the output transformer 13, respectively. In this case the amplifier 16 is not adapted to match the cable impedance.

The output voltages of the amplifiers 12 and 16 are added in the secondary winding 18, 18′ of the output transformer 13, which together with the artificial impedance 14 and the coaxial cable 1 with the characteristic impedance 2 constitutes a push-pull bridge circuit. Thus a particularly effective decoupling of the amplifying stages 12 and 16 is obtained, so that a mutual reaction of these amplifying stages, which may for example give rise to undue cross-modulation is avoided. It has been found that in the device described above a phase or amplitude distortion of the transmitted television signals may be minimized.

The efficiency of the device described for the transmission of the television signals to the characteristic impedance load 2 of the coaxial cable 1 is particularly advantageous, since the transmission of the higher signal frequencies to the coaxial cable 1 is effected through the amplifier 12, which matches the cable impedance, whereas for the lower signal frequencies which are supplied to the cable 1 through the amplifier 16, which is not adapted to match the cable impedance, the cable damping is particularly low. In this case the frequency band amplified by the amplifier 16, which is not adapted to match the cable impedance, may for example be the range from 0 to 30 kc./s. In the arrangement shown a pre-emphasis network 19 is provided between the input terminals 3 and the two-way filter 4 in order to increase the output for the higher signal frequencies, which are subjected to a high cable damping; thus at the same excitation of the amplifying tube 16, the tubes of the push-pull amplifier 12 are further excited.

For further improvement of the transmission quality an impedance 20 is connected in parallel with the primary winding of the output transformer 13, whereas between the central tapping of the secondary winding 18, 18′ and the end of the cable impedance remote from this winding provision is made of an impedance 21. The impedances 20 and 21 are proportioned to be such that the shunted T-filter thus formed by the windings of the transformer 13 matches the cable impedance; to this end an inductor and a capacitor may be used for the impedances 20 and 21 respectively. This measure has the advantage that harmful effect on the transmission quality of the television signals due to reflection in the coaxial cable is substantially avoided.

What is claimed is:

1. A device for the transmission through a transmission cable of a video signal containing a direct-current component, comprising a source of said video signal, a high-pass filter and a low-pass filter, said filters being connected to said source to provide a high-band signal and a low-band signal, respectively, a coupling transformer having a primary winding and a center-tapped secondary winding, high-band amplifier means having output terminals connected to the ends of said primary winding for applying said high-band signal to said primary winding, low-band amplifier means having an output terminal connected to said center tap for applying said low-band signal to the center-tap of said secondary winding, means connecting an end of said transmission cable to an end of said secondary winding whereby said cable forms an output transmission circuit for both of said amplifier means, an artificial impedance connected to the remaining end of said secondary winding, and means connected to the remaining end of said cable to derive the transmitted signals therefrom.

2. A device as claimed in claim 1, including a preemphasis network for emphasizing the higher frequencies of said video signal and interposed between said signal source and said filters.

3. A device as claimed in claim 1, in which said high-pass filter comprises the series combination of a resistor and an inductor, said high-band signal being derived from said inductor, and in which said low-pass filter comprises the series combination of a resistor and a capacitor, said low-band signal being derived from said capacitor.

4. A device as claimed in claim 1, including a load impedance connected between electrical ground and the remaining end of said transmission cable, and in which said artificial impedance is connected between electrical ground and said remaining end of said secondary winding.

5. A device as claimed in claim 4, including an impedance connected in parallel with said primary winding, and an impedance connected between electrical ground and the center-tap of said secondary winding, said last-named impedances having values to provide a T-filter in conjunction with said windings which substantially matches the impedance of said cable.

References Cited in the file of this patent

UNITED STATES PATENTS

| | | |
|---|---|---|
| 2,229,090 | Kinzer | Jan. 21, 1941 |
| 2,255,642 | Artzt | Sept. 9, 1941 |